May 22, 1956 L. S. WILLIAMS 2,746,383
TICKET SHUTTLE
Filed April 15, 1953
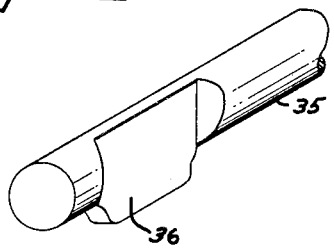
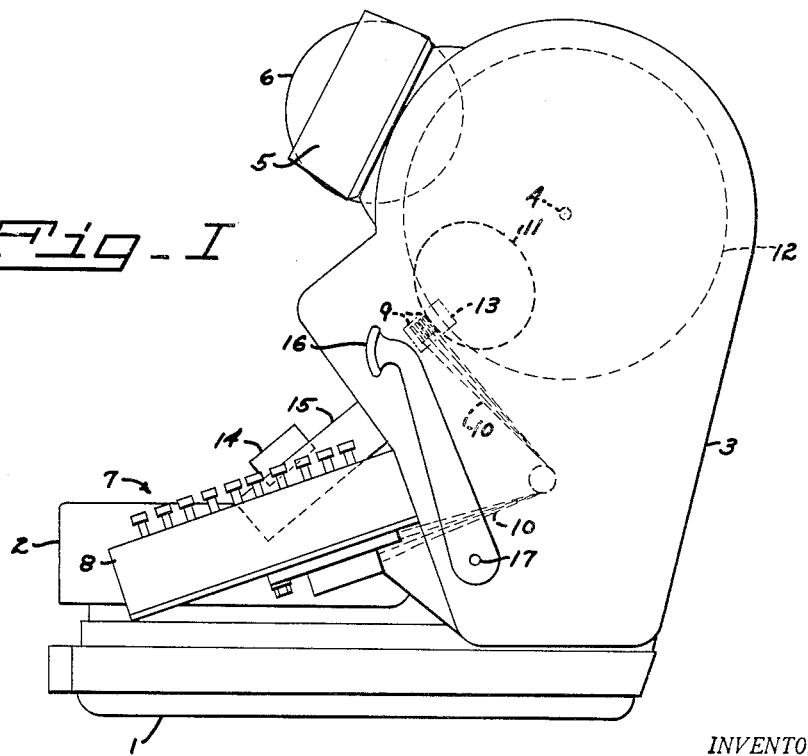
INVENTOR.
LAWRENCE S. WILLIAMS
BY
Marshall, Marshall & Yeasting
ATTORNEYS

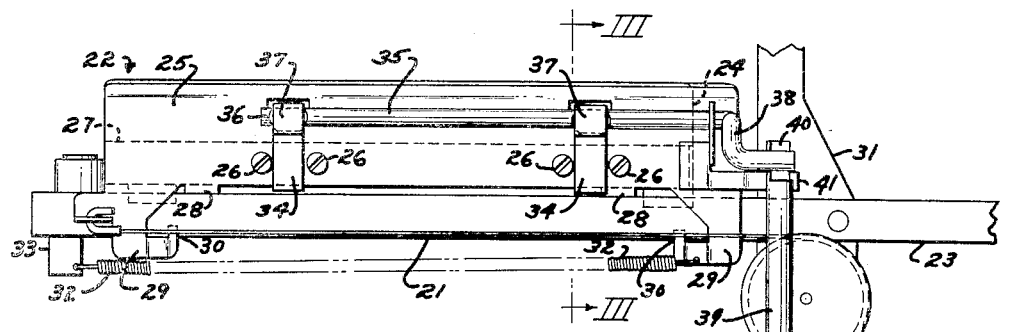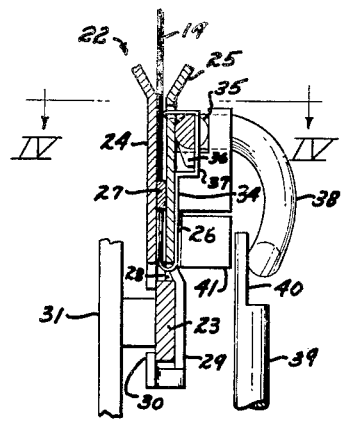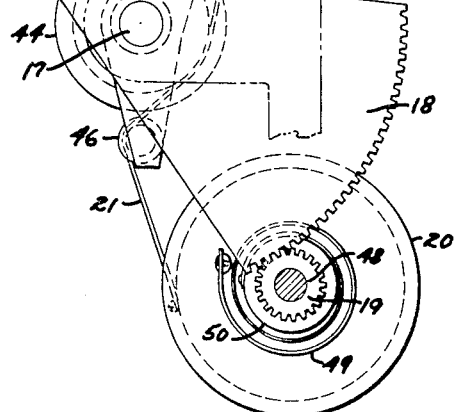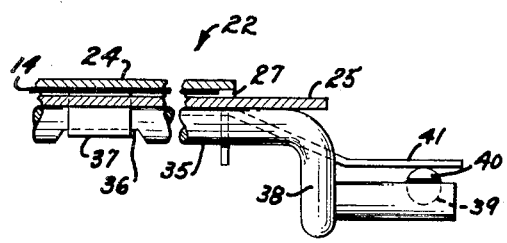
INVENTOR.
LAWRENCE S. WILLIAMS ited States Patent Office 2,746,383
Patented May 22, 1956

2,746,383

TICKET SHUTTLE

Lawrence S. Williams, Toledo, Ohio, assignor to Toledo Scale Company, Toledo, Ohio, a corporation of New Jersey Application April 15, 1953, Serial No. 348,969

7 Claims. (Cl. 101—93)

This invention relates to printing weighing scales, and in particular to means for transporting an imprint receiving ticket into and from a printing station inside the housing of such a scale.

The principal object of this invention is to provide means for individually carrying an imprint receiving ticket into a printing station located within the housing of a printing weighing scale.

Another object of the invention is to provide means for clamping a ticket in a transporting shuttle at the start of the movement of the shuttle toward the printing station, and for releasing the ticket upon the return of the shuttle to the ticket receiving station.

Still another object of the invention is to facilitate the printing of small, hard to handle tickets.

A further object of the invention is to provide means for transporting an imprint receiving ticket from an accessible location to an enclosed printing station where the ticket is to receive an imprint thereon.

Other objects and advantages will be apparent from the following description of a preferred embodiment of the invention.

According to the invention, a printing weighing scale is provided with a ticket carrying shuttle operable between ticket receiving station and ticket printing station. Clamping means carried by the shuttle is adapted, in response to operation of the shuttle, to clamp the ticket at the start of the reciprocation toward the printing station, to keep the ticket clamped throughout the reciprocation, and to release the ticket upon the return of the shuttle to the ticket receiving station. The printing weighing scale embodying this invention is fully shown and described in U. S. Application Ser. No. 186,433 to Walter A. Fink.

A preferred embodiment of the invention is illustrated in the accompanying drawings.

In the drawings:

Figure I is an end elevational view of a printing weighing scale embodying the invention.

Figure II is a side elevational view at an enlarged scale of the ticket shuttle and operating means therefor, parts being broken away and other parts being shown in section.

Figure III is a cross-sectional view taken substantially along lines III—III of Figure II to show the ticket clamping mechanism.

Figure IV is a fragmentary plan view taken substantially along lines IV—IV of Figure III.

Figure V is an oblique view of a portion of the operating means of the ticket clamp.

These specific figures and the accompanying description are intended merely to illustrate the invention, but not to limit its scope.

A printing weighing scale embodying the instant invention comprises a base 1 including a lever system (not shown) for supporting a load receiving platter 2 within. An upstanding housing 3, surmounting the rear of the base 1 houses load counterbalancing mechanism (not shown) operatively connected to the lever system.

Operation of the printing weighing scale shown in Figure I is as follows. As a commodity is placed upon the platter 2, the load counterbalancing mechanism and the lever system operatively connected to the platter operate to rotate a cylindrical chart of the well-known type which chart is mounted on a chart shaft 4. The chart (not shown) is provided with a plurality of columns of value indicia each of which columns corresponds to a particular price at which the commodity on the platter sells. Horizontally moveable parallel to the axis of the chart shaft 4 and mounted within a lens housing 5 is a moveable lens cell (not shown) adapted to center an operator's attention on one of the columns of value indicia on the cylindrical chart. The lens cell is moved within the lens housing by rotating a drive wheel 6 at the left end of the scale as viewed from the operator's position. It is shown as being at the far end of the scale in Figure I. The hand wheel 6 is rotated until the lens cell aligns with a price marking on a price chart (not shown) mounted parallel to the path of movement of the lens cell. When the lens cell is properly aligned with the price marking at which the commodity is to sell, the value of the commodity may be read from indicia on the cylindrical chart.

Upon reading the value of the commodity on the platter, the operator punches one key in each of several columns of keys 7 mounted on a keyboard 8. Punching of the keys on the keyboard 8 rotates a plurality of type-bearing wheels 9 to positions corresponding to the value as indicated on the cylindrical chart. The type wheels 9 are operatively connected one to each column of keys by means of cables 10.

The type wheels 9, a price ring 11 operatively connected to the lens cell by drive means not shown, and a flat disk chart 12 are each provided with printing characters adapted to be presented in a printing station 13. The flat disk chart 12 is fixed onto an extended end of the chart shaft 4 and is rotated with the cylindrical chart to present its raised printing characters indicative of the weight of the article on the platter 2 in the printing station 13. The price ring 11 lies in a plane inclined to the plane of the chart 12 and is operatively connected by means of a cable (not shown) to the lens cell which is movable horizontally within the lens housing 5. The printing characters are provided on a beveled face at the marginal edge of the price ring 11 so as to be coplanar with the printing characters on the disk chart 12. As the drive wheel 6 is rotated and the lens cell is moved to properly align with a price marking on the price chart, the price ring 11 rotates on its axis correspondingly. When the lens cell is aligned with a particular price marking at which the article on the platter 2 is to be sold, raised printing characters corresponding to the price marking are positioned in the printing station 13 by the price ring 11. The type wheels 9, as has already been mentioned, are arranged by punching keys on the keyboard 8, the punched keys being representive of the value of the article on the platter 2 as read on the chart through the lens cell. Value, price and weight printing characters are therefore set up in the printing station 13 on the type wheels 9, price ring 11, and disk chart 12 respectively. As shown in Figure I, the printing station 13 is within the housing 3 and is inaccessible to the operator as far as manually placing tickets into the printing station is concerned. The size of the area of the printing station 13 is limited since most of the space around the printing station is occupied by printing mechanism. Inked ribbons, mechanism for pressing the tickets against the printing characters, the means for driving the type wheels 9, the means for rotating the price ring 11, etc., occupy the area in the vicinity of the printing station 13. Since the printing station 13 is located within the housing 3 and is rather small in size, it is necessary that a ticket 14 to be printed in the printing station be carried there by some mechanical means. The mechanical means, in addition to carrying the ticket 14 into the printing station, must also hold the ticket so as not to permit movement of the ticket during the printing operation and thereby cause a blurred or double impression to be made on the ticket. The ticket 14 is transported from a ticket receiving station, shown in Figure I as being at the lower end of a ticket guide 15, to the printing station 13. Transportation of the ticket 14 is effected manually by pushing a handle 16 mounted on a shaft 17 which is operatively connected to the mechanism for transporting the ticket 14 to the printing station 13.

Referring now to Figure II, when the handle 16 is pushed rearwardly, a sector gear 18 mounted on the shaft 17 cooperates with a pinion 19 to rotate a cable take-up pulley 20. As the pulley 20 is rotated, it winds therearound a shuttle drive cable 21 to move a shuttle 22 in which the ticket 14 is clamped along a track 23 extending between the ticket receiving station and the ticket printing station 13. The shuttle mechanism for carrying the ticket into printing position and returning it to an exposed position is illustrated in Figures II, III and IV. Figure II shows the ticket shuttle 22 and the operating mechanism therefor as it appears when the mechanism is at rest and no ticket is clamped therein. Figures III and IV show a ticket clamped in the shuttle at the start of a printing operation just after the ticket has been clamped, but before the shuttle leaves the ticket receiving station. As shown in these figures, the shuttle 22 comprises a back plate 24 and a front plate 25. The back plate 24 is extended downwardly so that it slightly overlaps one edge of the track 23. The front plate 25 is secured to and spaced from the back plate 24 by a plurality of screws 26 and a spacer 27. The front plate 25 has a pair of depending lugs 28 adapted to ride on the upper surface of the track 23 and a pair of legs 29 extending downwardly along that side of the track 23 and fitted with tips 30 that, passing beneath the track 23, engage its back surface so that the combination of the lower portion of the back plate 24 and the legs 29 with the tips 30 nearly surround the track 23. The track 23 is mounted on a support member 31. Since the track 23 is in the form of a fairly wide strip, this construction, with a small amount of clearance, allows the shuttle 22 to travel freely along the track 23 without interfering with or catching on other structures located along its path.

As was mentioned previously, the shuttle drive cable 21 drives the shuttle 22 forwardly toward the printing station 13. It is returned to its ticket receiving position by a helical tension spring 32 connected between a stationary downwardly projecting finger 33 of the track 23 and the forward one of the shuttle legs 29. The upper edges of the shuttle back plate 24 and the shuttle front plate 25 are flared outwardly to form an entrance guide for directing the edge of the ticket 14 into the shuttle 22 as the ticket is inserted through the ticket guide 15. The ticket 14 is clamped or locked in place by a pair of spring fingers 34 that are mounted on the front plate 25 and that press the ticket against the back plate 24. When the shuttle 22 is in its ticket receiving position, the spring fingers 34 are retracted by a finger control shaft 35 having a coined flat and projecting rib 36 engaged behind a looped portion 37 of each spring finger 34. The forward end of the finger control shaft 35 is bent to form a goose-necked section 38 the end of which extends along a line parallel to the remainder of the control shaft 35 but is displaced laterally and downwardly therefrom. The relationship between the end of a goose-necked section 38 and the coined flats and projecting ribs 36 is such that movement of the goose-necked section 38 away from the shuttle 22 causes the projecting ribs 36 to release the pressure of the spring fingers 34 on the ticket.

The upper end of a ticket lock release shaft 39 is cut away leaving a narrow, upstanding segment 40 which, when the shuttle 22 is in ticket receiving position, is interposed between the goose-necked section 38 of the control shaft 35 and a brace 41 extending from the shuttle front plate 25. At the end of the return stroke of the handle 16, an arm 42 of the sector gear 18 strikes a pin 43 extending radially from the bottom of the ticket lock release shaft 39. This rotates the release shaft so that the narrow upstanding segment 40, which before rotation loosely entered the space between the end of the goose-necked section 38 and the brace 41, forces the goose-necked section 38 away from the shuttle 22. This rotates the control shaft 35 with its ribs 36 to release the ticket grasping spring fingers 34. These fingers are held out of grasping position until the start of the next printing cycle when the lock release shaft 39 is released and the fingers 34 spring in to grasp the ticket just before the shuttle moves towards the printing station.

The drive mechanism for the shuttle 22 is so arranged that, upon rotation of the shaft 17 by the handle 16 during a first small portion of rotation of the shaft 17, a loosely mounted guide pulley 44 and a yoke 45 carrying on one end a slack take-up pulley 46 cooperate with a light helical spring 47 to take up slack in the shuttle drive cable 21. While slack in the cable 21 is being taken up, the arm 42 releases the pin 43 at the bottom of the ticket lock release shaft 39 and permits the shaft 39 to rotate to the position shown in Figure IV. Rotation is brought about by the spring fingers 34 causing the control shaft 35 to pivot toward the shuttle 22. Pivotal movement of the control shaft 35 acts upon the upstanding segment 40 of the ticket lock release shaft 39 to have the end of the goosenecked section 38 engage the flat face on the upstanding segment 40 of the ticket lock release shaft 39. During this portion of rotation of the shaft 17, the spring fingers 34 clamp the ticket 14 against the back plate 24 of the shuttle 22. Further rotation of the shaft 17 causes the sector gear 18 engaged with the pinion 19 to rotate the cable take-up pulley 20 loosely mounted on a shaft 48 on which the pinion 19 is also mounted. A spiral spring 49 has one end fixed to a hub 50 fixed on a shaft 48 and the other end connected to the cable take-up pulley 20. The spiral spring 49 provides an elastic connection between the shaft 48 and the pulley 20.

As soon as the slack has been taken up from the cable 21, during which time the ticket 14 was clamped in the shuttle 22, the cable 21 drives the shuttle 22 into the printing station 13 where an imprint of the value, price, and weight of the article on the platter 2 is recorded on the ticket 14. The ticket 14 remains clamped in the shuttle 22 throughout the reciprocation toward the printing station and back to the ticket receiving station. As the shuttle 22 returns to the ticket receiving station, the upstanding segment 40 of the ticket lock release shaft 39 enters into the space between the end of the goose-necked section 38 of the control shaft 35 and the brace 41. During the last portion of movement of the shaft 17 at the end of the stroke, the arm 42 extending from the sector gear 18 engages the pin 43 on the bottom end of the release shaft 39. This causes the release shaft 39 to rotate and have the upstanding segment 40 thereof pivot the end of the goose-necked section 38 of the control shaft 35 outwardly, and thereby cause the coined flats and projecting ribs 36 to pivot the looped portions 37 of the spring fingers 34 outwardly to release the ticket 14 from the shuttle 22. The ticket 14 may then be removed from the shuttle 22. Printed on the ticket 14 will be the value, price and weight of the article on the platter 2.

Various changes may be made in the details of construction and in the combination and arrangement of the several parts within the scope of the claims without departing from the spirit of this invention.

Having described the invention, I claim:

1. In a device for carrying a ticket from a receiving station on the outside of a housing of a printing weighing scale to a printing station inside the housing, in combination, a shuttle for holding the ticket, a track on which the shuttle is mounted for reciprocation, a rotatably mounted shaft, means for reciprocating the shuttle from the receiving station at one end of the track to the printing station at the other end, normally closed resilient means for clamping the ticket in the shuttle, cam means for opening the resilient means, means fixed to the shaft for both driving the means for reciprocating the shuttle and the cam means, the cam means holding the resilient means open when the ticket is in the receiving station, means for allowing the means fixed to the shaft to disengage from the cam means during the beginning of the movement of the shuttle towards the printing station, whereby the normally closed resilient means close, and means for returning the shuttle to the receiving station after an imprint has been made on the ticket.

2. A device according to claim 1 in which the means for returning the shuttle to the receiving station comprises a spring.

3. In a device for carrying a ticket from a receiving station on the outside of a housing of a printing weighing scale to a printing station inside the housing, in combination, a track, an element holding shuttle mounted for reciprocation along the track, a rotatably mounted shaft, means for reciprocating the shuttle clamping means for locking the element in the shuttle, means for unclamping the clamping means when the shuttle is at the start of the reciprocating stroke, means fixed to the shaft for driving the means for reciprocating the shuttle, means fixed to the shaft for driving the means for unclamping the clamping means, means for allowing the means for driving the means for unclamping to disengage from the means for unclamping during the beginning of the reciprocating stroke towards the printing station, whereby the clamping means automatically close, and means for returning the shuttle from the printing station after an imprint has been made on the element.

4. In a device for carrying a ticket from a receiving station on the outside of a housing of a printing weighing scale to a printing station inside the housing, in combination, a shuttle for holding the ticket, a track on which the shuttle is mounted for reciprocation, a rotatably mounted shaft, means for reciprocating the shuttle along the track, a spring for clamping the ticket in the shuttle, a cam for holding the spring away from the shuttle when the shuttle is in the receiving station, a gear fixed to the shaft for driving the means for reciprocating the shuttle, a projection on the gear operatively connected to the cam for driving the cam, means for allowing the projection on the gear to disengage from its operative connection with the cam during the beginning of the movement of the shuttle towards the printing station, whereby the spring automatically moves into engagement with the shuttle, and means for returning the shuttle to the receiving station after an imprint has been made on the ticket.

5. A device according to claim 4 in which the means for reciprocating the shuttle comprises a cord.

6. In a device for carrying a ticket from a receiving station on the outside of a housing of a printing weighing scale to a printing station inside the housing, in combination, a track extending between the stations, a ticket holding shuttle reciprocable along the track, a rotatably mounted shaft, means for reciprocating the shuttle, resilient means for clamping the ticket in the shuttle, cam means for holding the resilient means open when the shuttle is in the receiving station, a gear fixed to the shaft for driving the means for reciprocating the shuttle, an arm on the gear for driving the cam means, means for allowing the arm on the gear to disengage from the cam means during the beginning of the movement of the shuttle towards the printing station, whereby the resilient means automatically close, and means for returning the shuttle to the receiving station after an imprint has been made on the ticket.

7. In a device for carrying a ticket from a recovering station on the outside of a housing of a printing weighing scale to a printing station inside the housing, in combination, a shuttle for holding the ticket, a track on which the shuttle is mounted for reciprocation, a rotatably mounted shaft, means for reciprocating the shuttle from the receiving station at one end of the track to the printing station at the other end, at least one spring normally positioned to clamp the ticket in the shuttle, means for operating the spring comprising a control shaft having a rib cooperating with the spring, a gear fixed to the shaft for moving the means for reciprocating the shuttle, an arm on the gear for driving the means for operating the spring, the rib of the control shaft holding the spring away from the shuttle when the ticket is in the receiving station, means for allowing the arm on the gear to disengage from the means for operating the spring during the beginning of the movement of the shuttle towards the printing station, whereby the spring moves to its normal position to clamp the ticket in the shuttle, and means for returning the shuttle to the receiving station after an imprint has been made on the ticket.

References Cited in the file of this patent

UNITED STATES PATENTS

| | | |
|---|---|---|
| 943,203 | Taylor | Dec. 14, 1909 |
| 1,686,940 | Tatousek | Oct. 9, 1928 |